Feb. 26, 1935. C. C. SMITH 1,992,781
FEEDING MECHANISM FOR SEWING MACHINES
Filed June 16, 1932 2 Sheets-Sheet 1
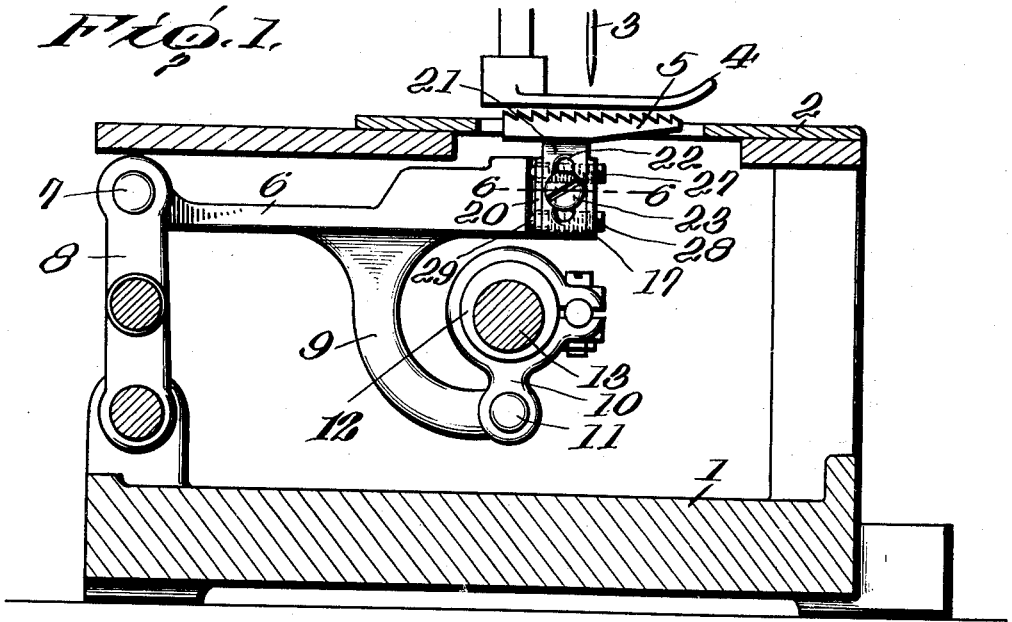
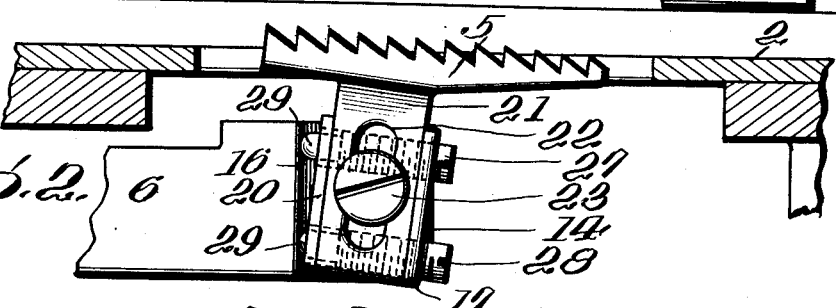
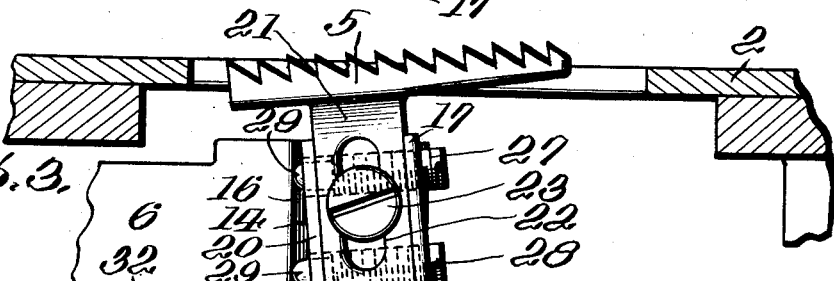
Inventor
Clarence C. Smith
By Sturtevant, Mason & Porter
Attorneys

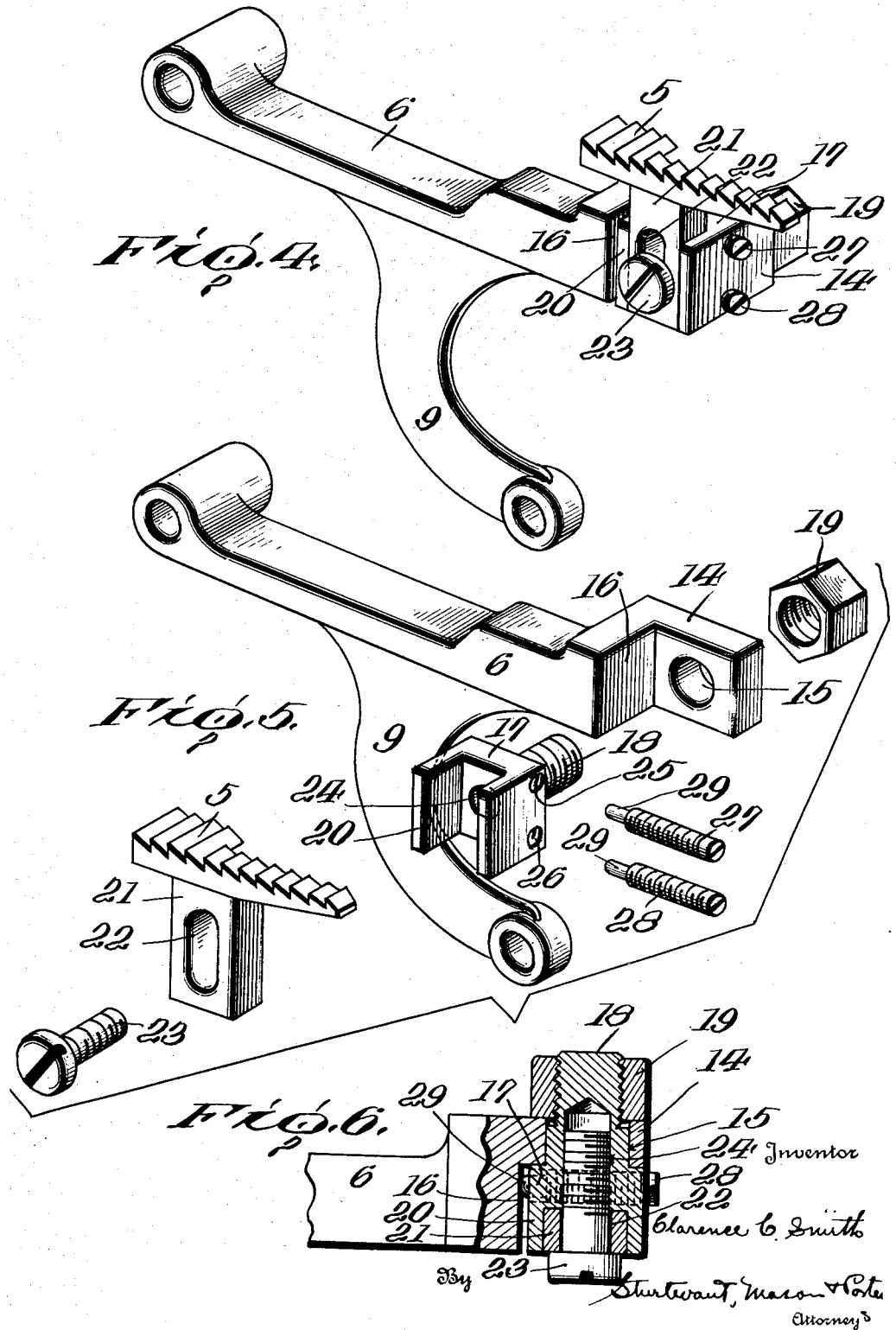

Patented Feb. 26, 1935

1,992,781

UNITED STATES PATENT OFFICE 1,992,781

FEEDING MECHANISM FOR SEWING MACHINES

Clarence C. Smith, Chicago, Ill., assignor to Union Special Machine Company, Chicago, Ill., a corporation of Illinois Application June 16, 1932, Serial No. 617,620

5 Claims. (Cl. 112—210)

The invention relates to new and useful improvements in a feeding mechanism for sewing machines and more particularly to a means for mounting a feed dog on the feed bar whereby the same may be adjusted thereon.

An object of the invention is to provide a means for supporting the feed dog on the feed bar whereby said feed dog may be raised and lowered and shifted to various set angular positions relative to the feed bar.

A further object of the invention is to provide a supporting means for the feed dog of the above type, wherein the feed dog is tilted by mechanical means and is locked in a set angular position by said tilting means.

In the drawings:

Fig. 1 is a view in section through a work support showing a portion of a feeding mechanism embodying the improvement, the feed dog being in horizontal position.

Fig. 2 is a view showing the supporting means for the feed dog and the work support with the feed dog tilted to an inclined position with the rear end of the dog raised.

Fig. 3 is a view similar to Fig. 2, showing the feed dog tilted so that the front end thereof is raised.

Fig. 4 is a perspective view of the feed bar with the feed dog attached thereto.

Fig. 5 is a perspective view showing the feed bar, feed dog and the parts supporting the same separated.

Fig. 6 is a sectional view on the line 6—6 of Fig. 1.

Fig. 7 is a vertical sectional view through the work support and the feed dog supporting means showing a modified form of the invention.

It is well known that when the feed dog of a four-motion feeding mechanism is set so that the feeding surface is horizontal, it will impart a uniform feed movement to the fabric in front of and in rear of the needle. It is also well known that when the feed dog is tilted so that its feeding surface is disposed at an angle to the horizontal with the front end thereof raised, the fabric will be fed to the needle faster than away from the needle when the needle is midway between the ends of the feed dog and thus the fabric is gathered as it is stitched. When the feed dog is tilted so that the rear end thereof is raised or higher than the front end, then there is a resulting stretching of the fabric.

The present invention has to do with the means for mounting the feed dog on the feed bar so that it may be set horizontally or inclined to the horizontal as desired. The feed dog is mounted on a supporting head which in turn is pivoted to the feed bar. The shank of the feed dog is secured to the head in one form of the invention so that it may be shifted vertically therein for raising and lowering the working position of the feed dog. This is accomplished by providing the shank of the feed dog with an elongated slot and clamping the shank to the head by a screw passing through said slot.

Passing through the holder for the feed dog are adjusting bolts, one above and the other below the clamping screw. These adjusting bolts bear against the end wall of the feed bar and by turning in one bolt and releasing the other, the feed dog is mechanically shifted from one set position to another and is locked in its set positions.

Referring more in detail to the drawings, the invention is shown as applied to a sewing machine which is provided with a supporting bed 1, on which is mounted the usual work support 2. The needle is indicated at 3 and a presser foot is indicated diagrammatically at 4. A feed dog 5 is mounted on a feed bar 6 which is shown pivoted at 7 to a feed rocker 8. The feed bar is provided with a depending forwardly projecting arm 9. An eccentric strap 10 is pivoted at 11 to the arm 9 and cooperates with an eccentric 12 on the main shaft 13. The feed rocker 8 is oscillated by a connection with a crank on the end of the main shaft 13. The feeding mechanism just described is shown in detail in the patent granted August J. Wohlpart, August 4, 1931, No. 1,817,727. Other types of mechanism may be used for operating the feed bar. It is essential only that it should be given back and forth and up and down movements at the end thereof on which the feed dog is mounted. The feed bar as shown in Fig. 5 is provided with an offset forwardly projecting arm 14 having an opening 15 therethrough. The offsetting of the arm provides a shoulder or wall 16.

The feed dog 5 is mounted on a supporting head 17 and this supporting head has a cylindrical projecting threaded stud 18 which substantially fits the opening 15. The head is capable of being shifted to different angular set positions in this opening and may be locked in a set position, as well as held attached to the arm 14 by a nut 19. The head 17 is provided with a recess 20 which is adapted to receive the shank 21 of the feed dog. Said shank 21 is provided with an elongated slot 22. A bolt 23 passes through the slot 22 and is threaded into the opening 24 in the head and serves to secure the feed dog to the head. The shank is so proportioned as to fit between the projecting portions forming the recess 20 and this prevents the feed dog from angular movement on the head but also permits said feed dog to be shifted vertically and bodily for raising and lowering the feed dog and thus changing the working position of the feed dog on the feed bar. When the feed dog is placed in the desired vertical position relative to the head, it is secured in this fixed position by the bolt 23.

Passing through the head 17 parallel with its upper face is a threaded opening 25. This opening is above the threaded opening 24 so that it does not intersect the same. Below the opening 24 is another threaded opening 26 parallel with the opening 25. An adjusting screw 27 is threaded into the opening 25. There is a similar screw 28 threaded into the opening 26. Each screw has a rounded projecting end 29. The screws are turned in until they bear against the flat wall 16. When both screws project the same distance from the rear face of the head 17, then the feed dog will be set and locked in a horizontal position, as shown in Fig. 1. By horizontal position is meant that the fabric engaging face thereof is substantially horizontal when the feed dog contacts with the fabric so that the clamping engagement on the fabric is substantially uniform both in front and in rear of the needle. This will result in a uniform feeding of the fabric sections both to and from the needle or stitching point.

By turning the screw 27 so as to withdraw the projecting end portion thereof into the head and by turning the screw 28 so as to project the end thereof farther from the head, the feed dog is shifted to the tilted position shown in Fig. 3. The nut 19 may be loosened slightly in order to permit this shifting of the head. The turning in of the screw 28, after the screw 27 has been released, will positively force the feed dog to the desired set inclined position. Thus it is that the feed dog is forcibly tilted to a set position by a mechanical means. After it is placed in the desired position, then the adjusting screw 27 is threaded in so as to bring the end thereof into contact with the wall 16 and this screw 27 will prevent any possible turning of the feed dog in a counter-clockwise direction around the axis of the stud 18. Likewise the adjusting screw 28 serves as a positive means for preventing the holder and the feed dog from turning in a clockwise direction about the axis of this stud 18. The angular positions of the feed dog are fixed by these two adjusting screws.

When the adjusting screws are shifted to the position shown in Fig. 2, then the feed dog is tilted so that the rear end of the feed dog will contact with the fabric first as it moves through the feed slot in the throat plate. This results in a feeding of the fabric faster in rear of the needle than in front of the needle and a slight stretching of the fabric as it is stitched. The feed dog as it passes through the throat plate clamps the fabric against the presser foot and the up and down stroke of the feed dog is sufficient so as to raise the presser foot slightly during the feed stroke. When the feed dog is horizontal, then it is uniformly active in the feeding of the fabric throughout the entire fabric engaging face thereof; and when the forward end is raised above the rear end, then it becomes active first with the increased feeding action in front of the needle; and likewise when the rear end is raised above the front end then the rear end becomes active first in the feeding of the fabric.

The feed dog is of the standard type used in connection with four-motion feeds and at the same time it is firmly secured to the feed bar so that it may be tilted and raised and lowered to change the working position of the feed dog or the extent that it moves above the throat plate. In Fig. 7 of the drawings another standard form of feed dog 5 is shown wherein the supporting shank 30 therefor is substantially horizontal and is provided with a recess adapted to engage a rib on the supporting member therefor. In this form of the invention, the holder 17 is solid and is provided with a rib 31 on its upper face. The feed dog recess engages this rib and the clamping bolt 32 clamps the feed dog to the holder 17. The holder is shifted for angular adjustment by the adjusting screws 27 and 28 in the manner described above. There is no opportunity for a vertical adjustment of the feed dog in this form of the invention, although it is apparent that means could be readily constructed to provide for vertical adjustment of the feed dog.

It will be noted from the above that the feed dog may be raised or lowered or may be tilted and these movements are independent of each other. This is of particular advantage in the placing of the feed dog on the feed bar. It sometimes occurs in the hardening process during the formation of the feed dog that the shank does not maintain its proper angular position. This can be taken care of and the feeding surface properly positioned by the adjustments just referred to. Furthermore, it will be noted that in Figs. 1 to 3, the pivot point around which the feed dog is shifted, is well under the feed dog and near the center thereof and also near the stitching point. This permits of a wide range of angular adjustment of the feed dog without materially affecting the vertical position of the feed dog at the stitching point.

It is obvious that minor changes in the details of construction and arrangement of the parts may be made without departing from the spirit of the invention as set forth in the appended claims.

Having thus fully described the invention, what I claim as new and desire to secure by Letters Patent is:

1. A feeding mechanism for sewing machines comprising a feed bar mounted for back and forth and up and down movement, a feed dog holder secured to said feed bar so that it may be shifted to different set positions about a horizontal axis, a feed dog, means for securing said feed dog to said holder so that said feed dog may be shifted to different set positions in said holder and means for shifting said holder and clamping the same in various set positions.

2. A feeding mechanism for sewing machines comprising a feed bar mounted for back and forth and up and down movement, a feed dog holder secured to said feed bar so that it may be shifted to different set positions about a horizontal axis, a feed dog, means for securing said feed dog to said holder, means for shifting said holder and clamping the same in various set positions, said means for securing the feed dog to the holder being constructed so as to permit said feed dog to be raised and lowered without disturbing the set position of the holder.

3. A feeding mechanism for sewing machines including a feed bar having at the free end thereof an offset arm providing a substantially vertical shoulder, said arm having an opening therethrough, a feed dog holder having a projecting stud extending through said opening for supporting said holder on the feed bar, a feed dog, means for securing said feed dog to said holder, adjusting screws threaded through said holder above and below the center of the projecting stud and adapted to bear against said shoulder whereby the adjusting screws may be used for shifting said holder to different set positions and for clamping said holder in a set position.

4. A feeding mechanism for sewing machines including a feed bar having at the free end thereof an offset arm providing a substantially vertical shoulder, said arm having an opening therethrough, a feed dog holder having a projecting stud extending through said opening for supporting said holder on the feed bar, a feed dog, means for securing said feed dog to said holder, adjusting screws threaded through said holder above and below the center of the projecting stud and adapted to bear against said shoulder whereby the adjusting screws may be used for shifting said holder to different set positions and for clamping said holder in a set position, said means for securing the feed dog to said holder permitting said feed dog to be raised and lowered on said holder without disturbing the set position of the holder.

5. A feeding mechanism for sewing machines comprising a feed bar mounted for back and forth and up and down movement, a feed dog, means for pivotally supporting said feed dog whereby said feed dog may be swung on an axis at right angles to the plane of movement of the feed bar, means for shifting said feed dog on said pivotal support to different angular set positions relative to the feed bar and means whereby said feed dog may be raised and lowered relative to the feed bar.

CLARENCE C. SMITH.